US008230490B2

(12) United States Patent
Zapata et al.

(10) Patent No.: US 8,230,490 B2
(45) Date of Patent: Jul. 24, 2012

(54) SYSTEM AND METHOD FOR AUTHENTICATION OF USERS IN A SECURE COMPUTER SYSTEM

(75) Inventors: Onesimo Zapata, Avon, OH (US); Susan E. Zielinski, Chardon, OH (US); Deana M. Flannery, Avon, OH (US)

(73) Assignee: Keycorp, Cleveland, OH (US)

( * ) Notice: Subject to any disclaimer, the term of this patent is extended or adjusted under 35 U.S.C. 154(b) by 1023 days.

(21) Appl. No.: 11/830,968

(22) Filed: Jul. 31, 2007

(65) Prior Publication Data

US 2009/0037995 A1 Feb. 5, 2009

(51) Int. Cl.
*H04L 29/06* (2006.01)
(52) U.S. Cl. ............. 726/9; 713/155; 713/168; 713/170
(58) Field of Classification Search ........................ 726/9
See application file for complete search history.

(56) References Cited

U.S. PATENT DOCUMENTS

| | | | | |
|---|---|---|---|---|
| 5,058,108 | A | * | 10/1991 | Mann et al. .................... 370/409 |
| 6,023,698 | A | | 2/2000 | Lavey, Jr. et al. |
| 6,192,382 | B1 | | 2/2001 | Lafer et al. |
| 6,401,125 | B1 | | 6/2002 | Makarios et al. |
| 6,415,313 | B1 | | 7/2002 | Yamada et al. |
| 6,438,600 | B1 | | 8/2002 | Greenfield et al. |
| 6,549,773 | B1 | | 4/2003 | Linden et al. |
| 6,628,644 | B1 | | 9/2003 | Nelson et al. |
| 6,632,248 | B1 | | 10/2003 | Isaac et al. |
| 6,691,232 | B1 | | 2/2004 | Wood et al. |
| 6,715,080 | B1 | | 3/2004 | Starkovich et al. |
| 7,092,942 | B2 | | 8/2006 | Frieden et al. |
| 7,100,049 | B2 | | 8/2006 | Gasparini et al. |

(Continued)

OTHER PUBLICATIONS

Persiano et al., A Secure and Private System for Subscription-Based Remote Services, Nov. 2003, ACM Transactions on Information and System Security, vol. 6 Issue 4, pp. 472-500.*

(Continued)

*Primary Examiner* — Taghi Arani
*Assistant Examiner* — Kenneth Chang
(74) *Attorney, Agent, or Firm* — Thompson Hine L.L.P.

(57) ABSTRACT

A system and method of authenticating a user in a secure computer system in which a client computer transmits to the secure computer system a request for a sign-on page, the computer system transmits to the client computer a prompt for a first user identifier, and in response to the prompt, the client computer transmits to the computer system a request including a first identifier, a second identifier stored in an object stored at the client computer and a plurality of request header attributes. The computer system includes a server software module that authenticates the first user identifier and the second user identifier, and compares the transmitted plurality of request header attributes with a plurality of request header attributes stored at the computer system and associated with the first and second user identifiers. If the first and second user identifiers are authenticated, and if the transmitted request header attributes match stored request header attributes, the server software module transmits a success message to the client computer to be viewed by the user, and the user is allowed to access the secure computer system. In one embodiment, each transmitted request header attribute is given a numerical weighted value and the comparison of request header attributes includes adding the assigned numerical values of matching attributes to arrive at a total value, then transmitting the success message to the client computer only if the total value of matching request header attributes is at least a certain predetermined numerical total.

21 Claims, 19 Drawing Sheets

U.S. PATENT DOCUMENTS

| | | | |
|---|---|---|---|
| 2002/0007454 A1* | 1/2002 | Tarpenning et al. | 713/156 |
| 2002/0133459 A1* | 9/2002 | Polk et al. | 705/40 |
| 2002/0138728 A1* | 9/2002 | Parfenov et al. | 713/170 |
| 2002/0169988 A1* | 11/2002 | Vandergeest et al. | 713/201 |
| 2003/0084302 A1* | 5/2003 | de Jong et al. | 713/185 |
| 2003/0126438 A1* | 7/2003 | Wheeler et al. | 713/168 |
| 2003/0163739 A1* | 8/2003 | Armington et al. | 713/202 |
| 2003/0204743 A1* | 10/2003 | Devadas et al. | 713/200 |
| 2004/0128502 A1* | 7/2004 | Royer | 713/156 |
| 2004/0165008 A1 | 8/2004 | Levine et al. | |
| 2004/0168083 A1 | 8/2004 | Gasparini et al. | |
| 2004/0187018 A1* | 9/2004 | Owen et al. | 713/200 |
| 2005/0033703 A1* | 2/2005 | Holdsworth | 705/67 |
| 2005/0154886 A1 | 7/2005 | Birk et al. | |
| 2005/0177750 A1 | 8/2005 | Gasparini et al. | |
| 2005/0268107 A1 | 12/2005 | Harris et al. | |
| 2005/0283443 A1 | 12/2005 | Hardt | |
| 2006/0015358 A1* | 1/2006 | Chua | 705/1 |
| 2006/0021004 A1 | 1/2006 | Moran et al. | |
| 2006/0095422 A1 | 5/2006 | Kikuchi | |
| 2006/0127051 A1 | 6/2006 | Tsumagari et al. | |
| 2006/0204051 A1* | 9/2006 | Holland, IV | 382/115 |
| 2006/0218133 A1* | 9/2006 | Atkin et al. | 707/4 |
| 2006/0282660 A1* | 12/2006 | Varghese et al. | 713/155 |

OTHER PUBLICATIONS

Jutla et al., Adding User-Level SPACe: Security, Privacy, and Context to Intelligent Multimedia Information Architectures, Aug. 2006, Proceedings of the 2006 IEEE/WIC/ACM international conference on Web Intelligence and Intelligent Agent Technology, pp. 77-84.*

* cited by examiner

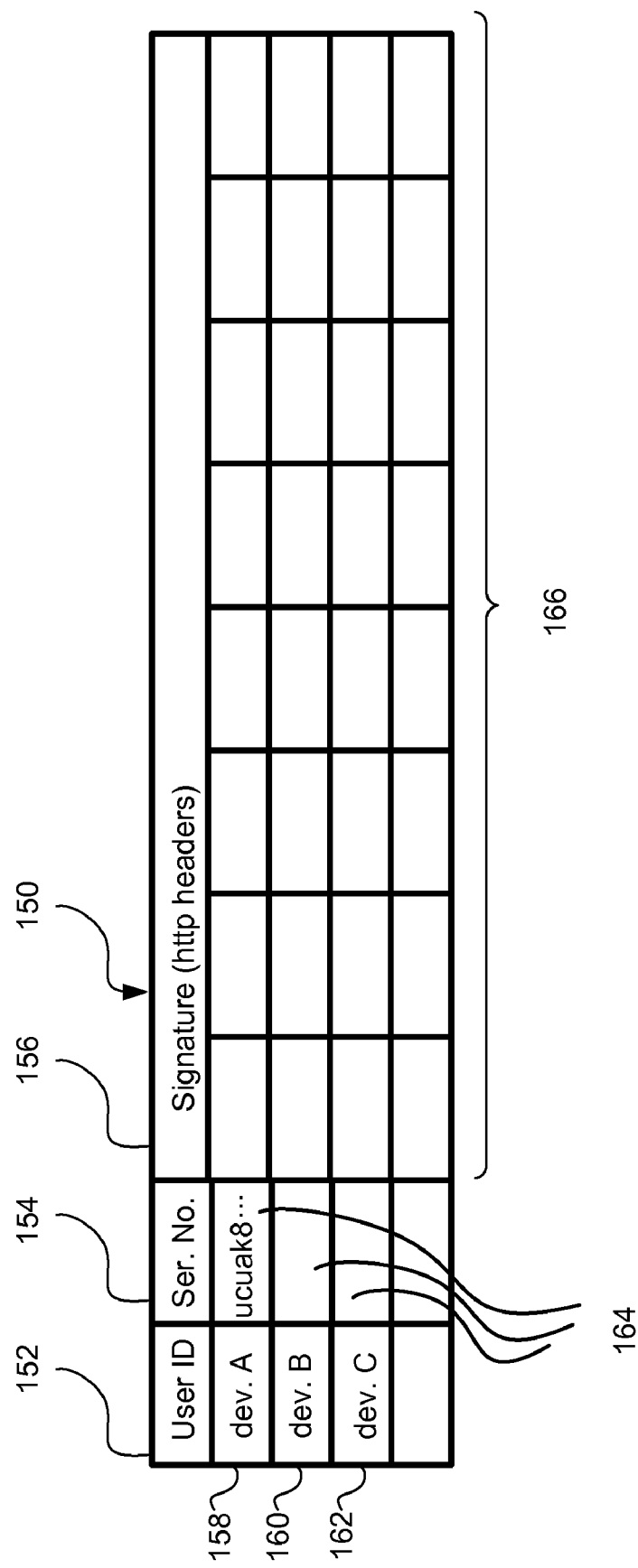

Online Banking and Investing 1-800-539-1539

Confirm Your Identity

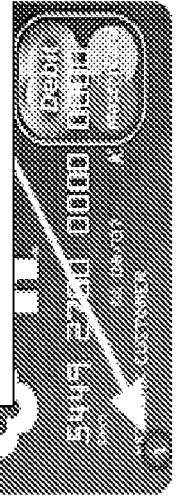

Now, please enter your Key ATM or Debit Card PIN. This is the password that you enter at the ATM machine when using your ATM Card. You can enter this information as either numbers or letters (upper or lower case).

Enter your Key ATM or Debit Card PIN:

We will also need the card issue number associated with your Key Debit Card. The card issue number is located in the lower left hand corner of your card.

Enter your Key Debit Card Issue Number:

12345

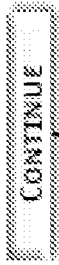

CONTINUE    CANCEL

FIG. 9

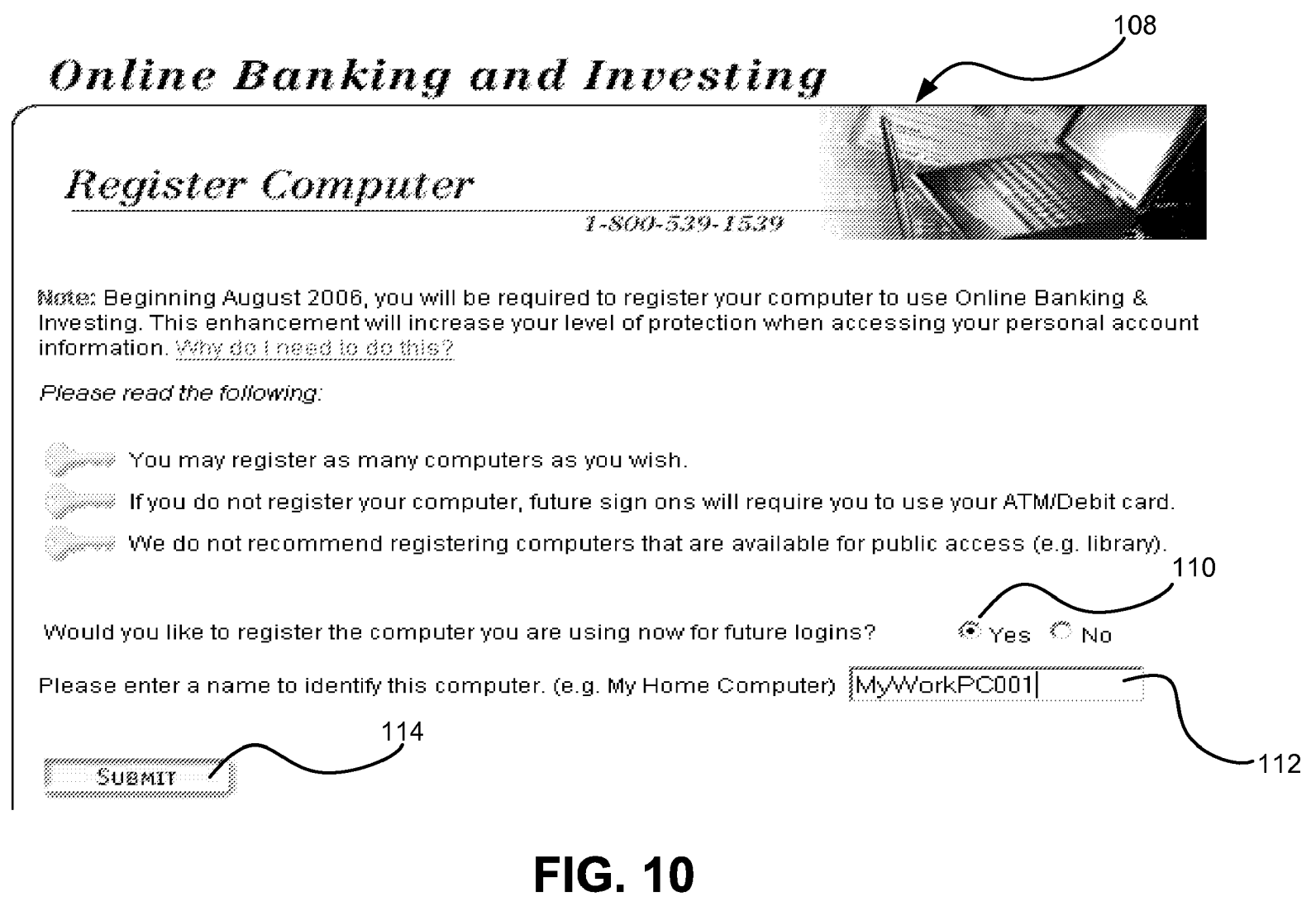

Online Banking and Investing

Register Computer 1-800-329-1529

*Note:* Beginning August 2006, you will be required to register your computer to use Online Banking & Investing. This enhancement will increase your level of protection when accessing your personal account information. *Why do I need to do this?*

Please read the following:

- You may register as many computers as you wish.
- If you do not register your computer, future sign ons will require you to use your ATM/Debit card.
- We do not recommend registering computers that are available for public access (e.g. library).

Would you like to register the computer you are using now for future logins?  ● Yes  ○ No Please enter a name to identify this computer. (e.g. My Home Computer) [MyWorkPC001]

[SUBMIT]

FIG. 10

Acceptance of Agreement and Signature
By selecting the Accept button below, it constitutes your written signature and approval of, and agreement to be bound by, the terms of this Agreement.

- Electronic Records Disclosure
- Service Agreement and Disclosure
- Key Investment Services (KIS) Service Agreement
- KeyBanc Capital Markets Inc. Service Agreement
- Wire Transfer Terms and Conditions
- Online Statement and Document Delivery Service Agreement – Authorization and Consent Print this Page

*Electronic Records Disclosure* — 40

DISCLOSURE

In connection with the Online Banking and Investing Service, all related agreements, notices, disclosures, and other communications ("Electronic Records") provided by KeyBank National Association and its affiliates (collectively called "Key") are available electronically on this Web Site. Electronic Records are generally not available on paper or in a non-electronic form from Key, except Key may at its option provide Electronic Records in paper-based media as requested by you. You can print Electronic Records from your Internet access device if you have the necessary equipment. If you do not consent to the use of Electronic Records, the Online Banking and Investing Services are not available to you. You may request a paper copy of any Electronic Record by emailing your request to Key at this Web Site, or by contacting Online customer service at 800-539-1539, but Key may charge you its fees and charges then in effect and published for providing these copies. If you subsequently withdraw your consent for Electronic Records, Key will no longer provide these Services to you, and you will remain responsible to perform timely all your service and account obligations to Key and all third parties. To withdraw your consent, you must send an adequate notice by email to Key at this Web Site and allow Key a reasonable time to act on this notice.

System Requirements

Decline    Accept — 44

FIG. 13

SYSTEM AND METHOD FOR AUTHENTICATION OF USERS IN A SECURE COMPUTER SYSTEM

BACKGROUND

The disclosure relates to computer systems and, more particularly, to systems and methods for authenticating users in a secure computer system.

Computer networks, including the Internet, facilitate the transmission of confidential data between computers at physically and geographically remote locations. An area where such confidential data transmission may occur is electronic commerce and, more particularly, electronic banking. Electronic commerce over computer networks may require that a computer system storing confidential information at one location make that information available to a remote user at another location over an unsecured network. In order to minimize the likelihood of an unauthorized user gaining access to such confidential information, it may be necessary for such computer systems to require a remote computer user to authenticate himself or herself in order to access confidential information. Such authentication procedures may include the use of alpha-numeric serial numbers and passwords. The serial number and password may be provided by the remote user or stored on the computer used by the remote user and transmitted over the network to the computer system maintaining the confidential information. The computer system may then match that serial number and password with stored serial numbers and passwords corresponding to that user in order to gain access to the confidential information pertaining to that user.

In the field of electronic banking, the Federal Financial Institutions Examination Counsel (FFIEC) has issued guidelines that regulators expect banks to use when authenticating the identity of bank customers using online products and services. The FFIEC considers single-factor authentication (for example, a user identification number and password) to be inadequate for high-risk transactions, such as those involving access to customer information or the movement of customer funds. Accordingly, banks have developed user authentication methodologies using multiple and different authentication criteria. For example, such criteria could compromise something the user knows (a user identification number and password), something the user has (a token, secure browser cookie, or flash local shared object) and something the user is (voiceprint, fingerprint or facial recognition). However, a disadvantage of such methodologies is that the third criteria may require the user to implement costly computer components or peripherals. Accordingly, there is a need for a user authentication process and system that may involve multiple factors but does not require additional computer components, such as fingerprint scanners, retinal scanners or voice recognition software.

SUMMARY

The disclosed system and method authenticates users in a secure computer system and utilizes multiple factors for authentication. In one embodiment, the system and method are employed to authenticate a user over a computer network. In a more specific aspect, the system and method authenticate a user to enable the user to gain access to the user's confidential financial information over an unsecured network such as the Internet.

A disclosed method of authenticating a user in a secure computer system includes the steps of transmitting from a client computer of the user to the computer system a request for a sign on page, transmitting from the computer system to client computer a prompt for a first user identifier, and in response to the prompt, transmitting from the client computer to the computer system a request including the first user identifier, a second user identifier and a plurality of request header attributes. The second user identifier may be stored in an object stored on the client computer and, in one embodiment, also may be stored in a local shared object persisted on the client computer. The computer system may authenticate the first user identifier, the second user identifier and may compare the transmitted plurality of request header attributes with a plurality of request header attributes stored at the computer system and associated with the first user identifier. If the first and second user identifiers are authenticated, and if the transmitted request header attributes correspond to the stored request header attributes, the computer system may transmit a success message to the client computer to be viewed by the user. Thereafter, the user may gain access to the computer system.

In one embodiment, the request header attributes may each be assigned a value, which may be a numeric value. When the request header attributes sent by the client computer are matched to the request header attributes stored at the computer system, the values of the matching request header attributes may be totaled. If that total is at least a predetermined value, the success message may be transmitted from the computer system to the client computer. Also in the preferred embodiment, if the total of the weighted values of the matching request header attributes equals at least 80 percent of the total weighted values, the computer system may provide access to the client computer, provided the first and second identifiers also match.

However, if a match does not exist, or if the total of the weighted values of the request header attributes do not equal or exceed the predetermined value, an error message may be transmitted from the computer system to the client computer. The user at the client computer may be required to re-enroll in the secure computer system.

The re-enrollment may involve re-authenticating the user. The user may provide identifying information personal to the user and provide the first identifier. If that provided information matches, the computer system may prompt the user to register his or her client computer. If the user consents, the computer system may register the client computer. In one preferred embodiment, the client computer may be registered by creating a serial number and saving the serial number and request header information from the user computer storage associated with the user, encrypting the serial number, then creating a browser cookie and saving that cookie on the user computer. The computer system may also save the encrypted serial number in a local shared object on the user computer. If a previous serial number exists on the user computer, that serial number may be expired in the database at the client computer. In addition, the browser cookie that contains the old serial number may also be expired. The old serial number may also be deleted from the local shared object. At this point, the user is authenticated and the computer system may allow access to information stored on the computer system.

A disclosed system for authenticating a user in a secure computer system may include a client computer operable by a user, a server associated with a secure computer system in communication with the client computer having storage, a client software module utilized by the client computer for sending to the server a request for a sign on page, and a server software module utilized by the server for transmitting from the server to the client computer a prompt for a first user identifier. The client software module, in response to the prompt, transmits from the client computer to the server a request including the first user identifier, a second user identifier stored in an object stored at the client computer and a plurality of request header attributes. The server software module validates the first and second user identifiers and compares the transmitted plurality of request header attributes with a plurality of request header attributes in the storage at the server and associated with the first identifier. If the first and second user identifiers are validated by the server software module, and if the transmitted request header attributes correspond to the stored request header attributes, the server software module allows the user client computer access to the secure computer system.

Accordingly, the disclosed method and system for authentication of users in a secure computer system provides a multilayered authentication process. This multilayered process may utilize computer forensics in the form of request header attributes. The disclosed system and method may effect user authentication over a network in a manner that may be relatively quick to implement, require minimal user input and not require peripheral devices.

Other advantages of the disclosed system and method will be apparent from the following description, the accompanying drawings and the appended claims.

BRIEF DESCRIPTION OF THE DRAWINGS

FIG. 2 is a record of user authentication information for a user of the system and method depicted in FIG. 1;

FIG. 9 is a screen of the system of FIG. 1 that requires a user to enter identifier information;

FIG. 10 is a screen of the system of FIG. 1 inquiring whether a user wishes to register his or her computer with the system of FIG. 1;

FIG. 13 is a screen providing disclosure information to a user in the authentication process shown in FIG. 3;

DETAILED DESCRIPTION

Figure 1:
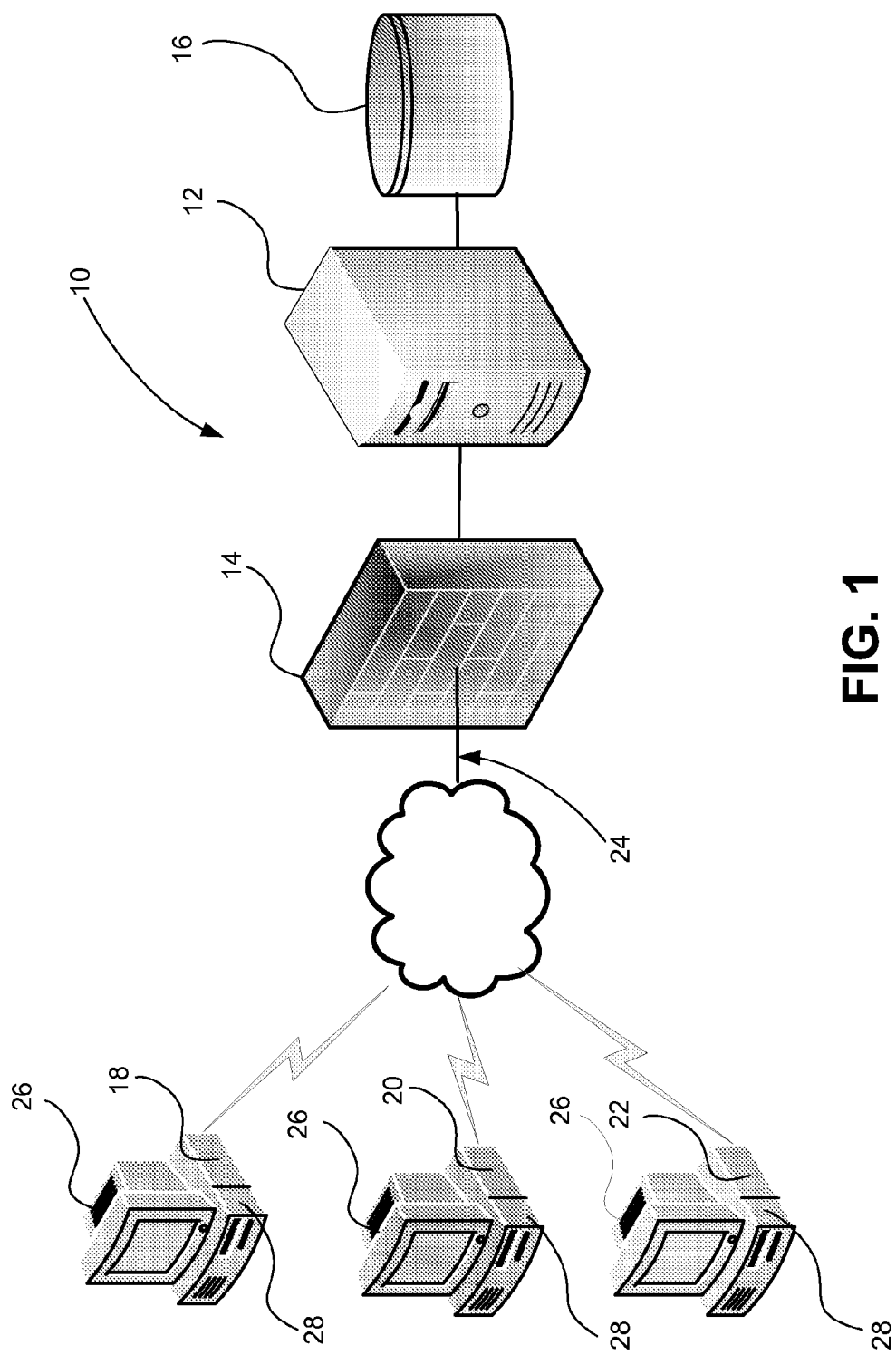
FIG. 1 is a schematic diagram of an embodiment of the disclosed computer system.

As shown in FIG. 1, the system for authentication of users in a secure computer system, generally designated 10, may include a server 12 positioned behind a firewall 14. A storage device, such as a database 16, is associated with the server 12. The server may communicate with a plurality of client computers 18, 20, 22 over a network 24 that may be the Internet. The network 24 may be wireless, or include wireless components. The client computers 18, 20, 22 may include wireless devices such as cellular telephones, personal digital assistants or other hand-held devices, or portable computers. Each client computer 18, 20, 22 may include a client software module that may have at least one browser program such as Internet Explorer, Safari NetScape, America Online and the like. Such browser programs may communicate with a server by sending a request over the network 24 that includes a plurality of request headers. The request headers each contain information about the computer and the user.

For example, the request headers may include the following attributes: an accept header (specifies which Internet media types are acceptable for the response from the web server and assigns preferences to them), an accept-encoding header (specifies which data format transformations, such as compression mechanisms, are acceptable for the response and assigns preferences to them), a referrer header (specifies, for the server's benefit, the address of the resources (URI) from which the request-URI was obtained), a user-agent header (information about the user-agent (client) originating the request), a character encoding header (returns the name of the character encoding used in the body of the request), a local header (the preferred local that the client will accept content in, based upon the accept-language header), an IP address header (the Internet protocol (IP) address of the client that sent the request) and a remote host header (the fully qualified name of the client that sent the request, or the IP address of the client if the name cannot be determined).

Each of the client computers 18, 20, 22 may also include a display screen 26 and storage 28 for the client software module. Storage may be integral with computers 18, 20, 22, may be connected over a network, may be a peripheral, or may be shared among the computers.

The server 12 of the system 10 contains a server software module that may provide three levels of authentication of a user of client computers 18, 20, 22 without need of providing specialized components or peripheral devices to the client computers. In order to implement the disclosed authentication method, a user may be required to enroll in the secure computer system represented by server 12 and storage 16.

Enrollment Process

The following enrollment process will be described with reference to enrollment by a customer of a bank or other financial institution in an online banking and investing service. However, it is to be understood that the disclosed system and method for authentication of users in a secure computer system is not limited to users of an online banking and investment service. In fact, the disclosed system and method for authentication may be used in any number of applications such as, for example, a computer system providing access to insurance policies and records, online purchasing of goods and services or any online system for accessing confidential information over a network.

Figure 3A:
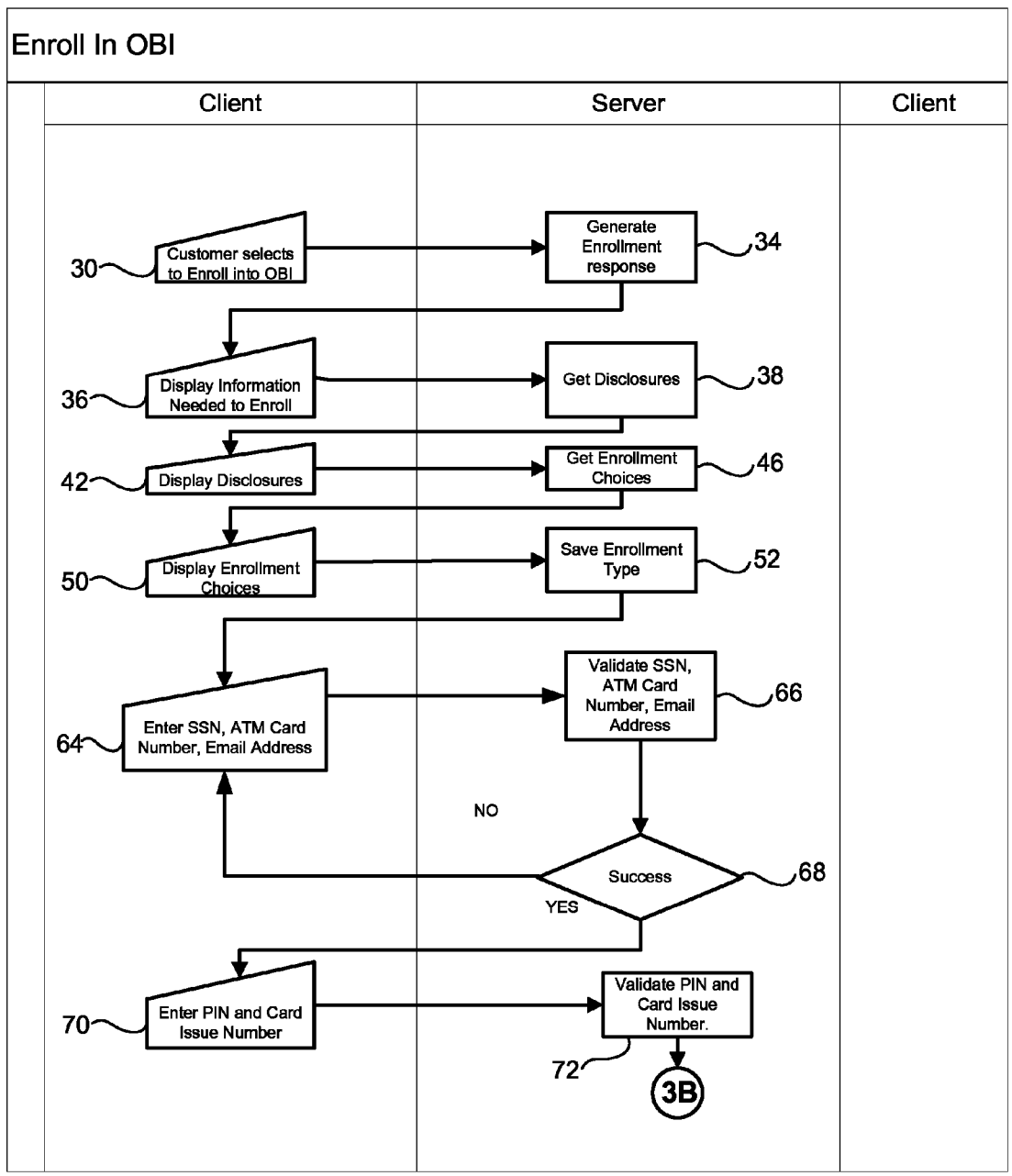
FIGS. 3A, 3B and 3C are a flow chart showing a process in which a user enrolls in the computer system shown in FIG. 1.
Figure 3B:
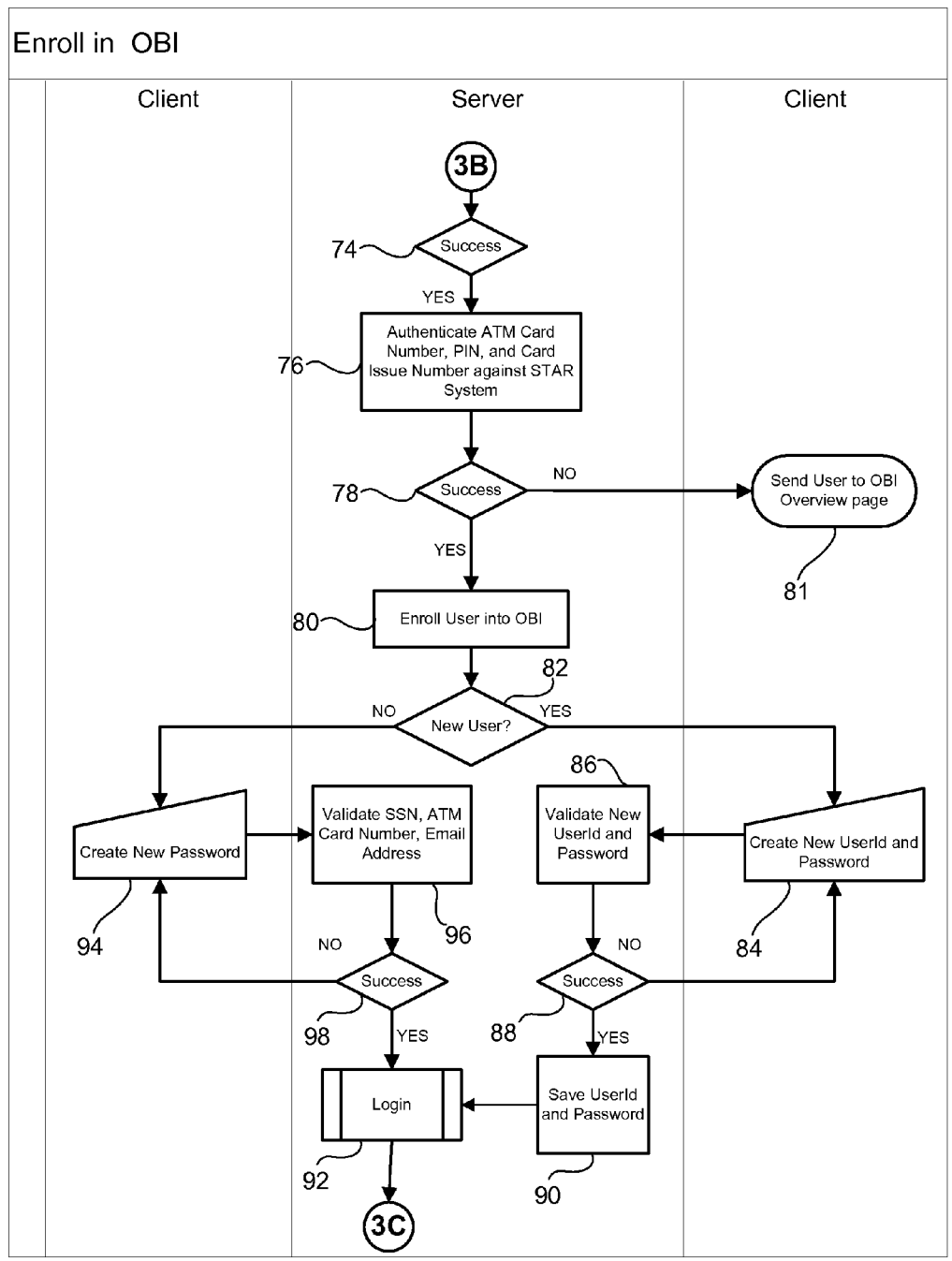
Figure 3C:
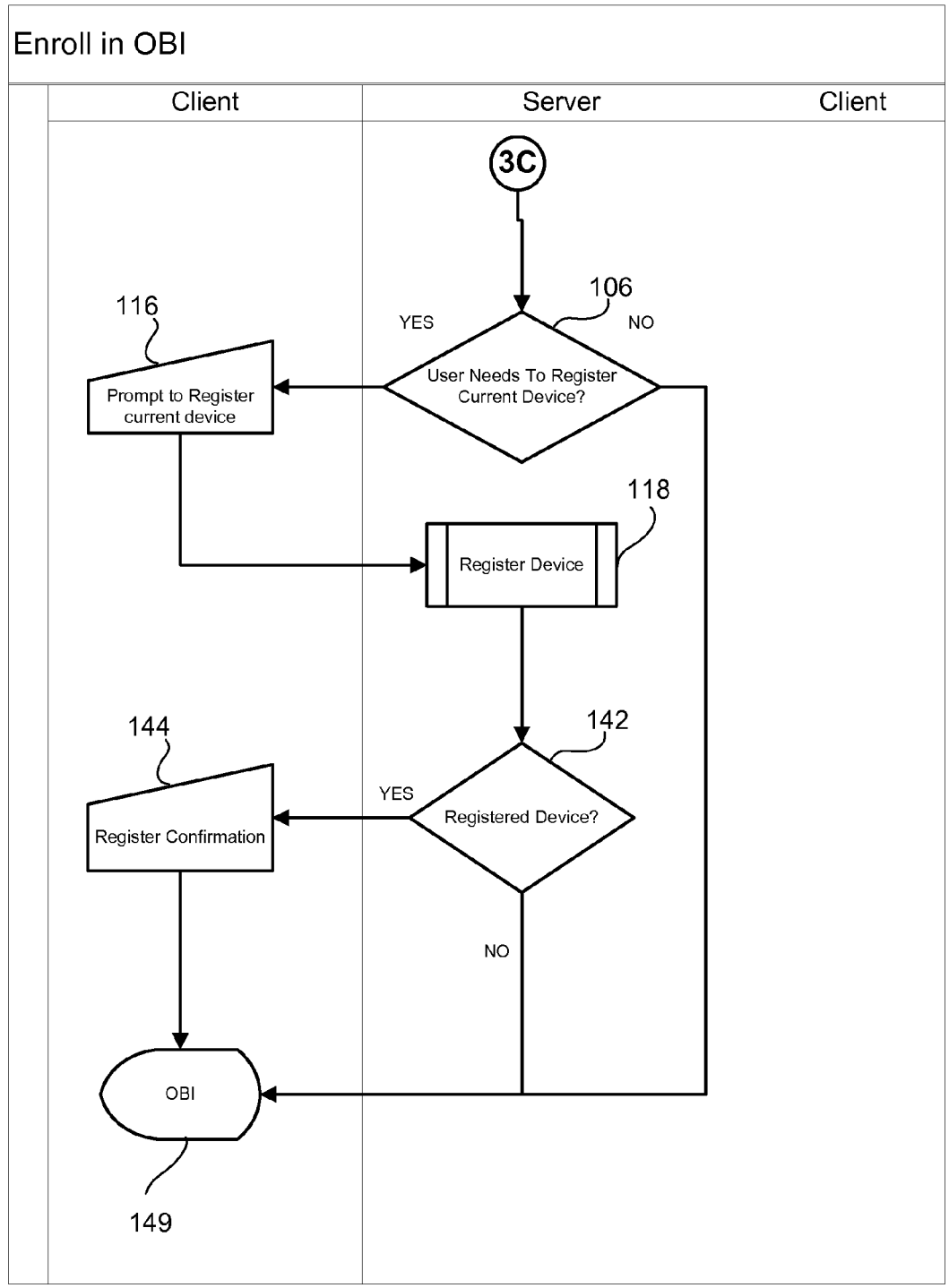
Figure 12:
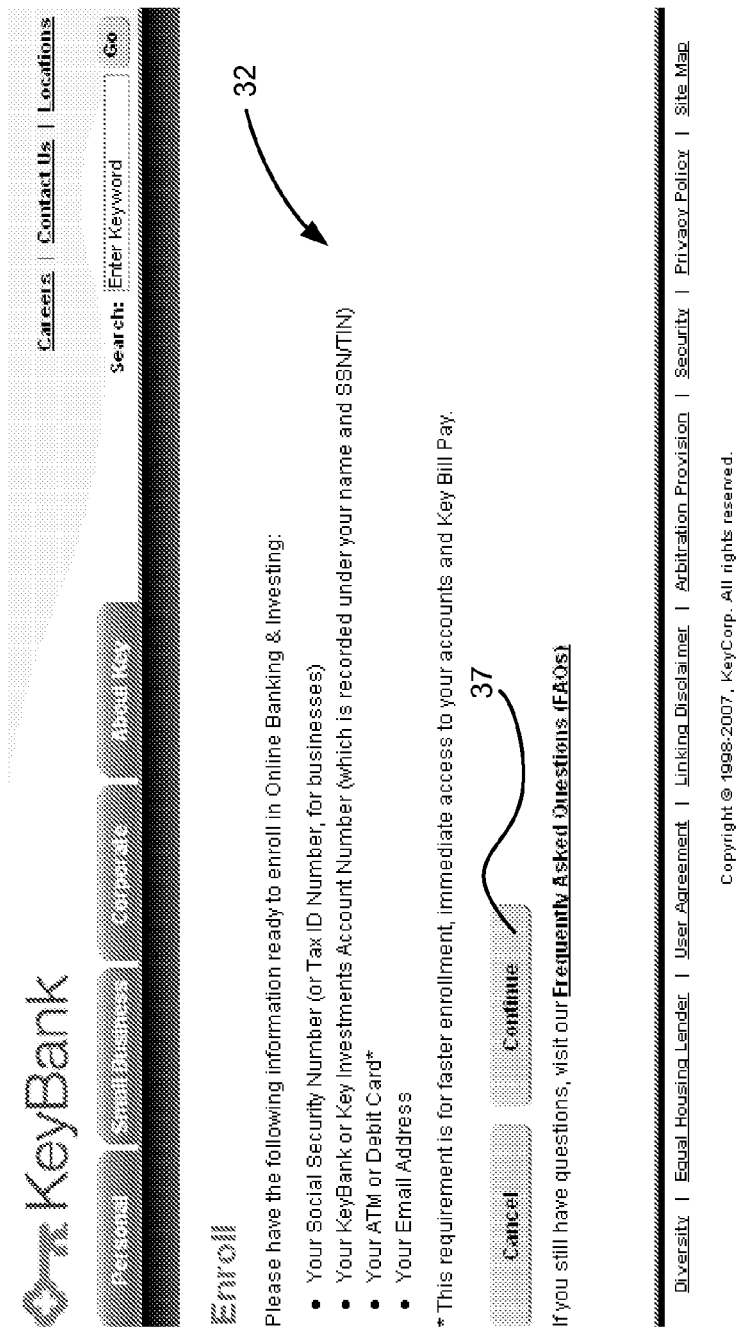
FIG. 12 is a screen asking a user to enroll in the authentication process shown in FIG. 3.

As shown in FIGS. 3A, 3B and 3C, the enrollment process may begin with a user, which in reference to FIGS. 3A-3C is a bank customer who already has applied for and obtained an ATM (automatic teller machine) card or debit card having a PIN (personal identification number) and card issue number. As shown in block 30, the enrollment process may begin with a potential user of the online services logging on to a web site where the service is provided. As shown in FIG. 1, a user at computer 18, for example, may access the enrollment program, stored in server 12 over the Internet 24. In response to the request, as shown in FIG. 12, the server 12 may send a page 32 to computer 18, where it is shown on display 26. The page 32 may ask the user to have certain information ready to be sent to the server 12. As shown in FIG. 3A, the step of generating the page is shown at block 34, and the display of the page 32 on the computer display 26 is shown at block 36. If the user clicks the "Continue" button 37 (FIG. 12), the message is received by the server 12 and, as indicated in block 38, and the server may retrieve and send an appropriate disclosure document page 40 for the user, shown in FIG. 13 and indicated at block 42 in FIG. 3A.

Figure 14:
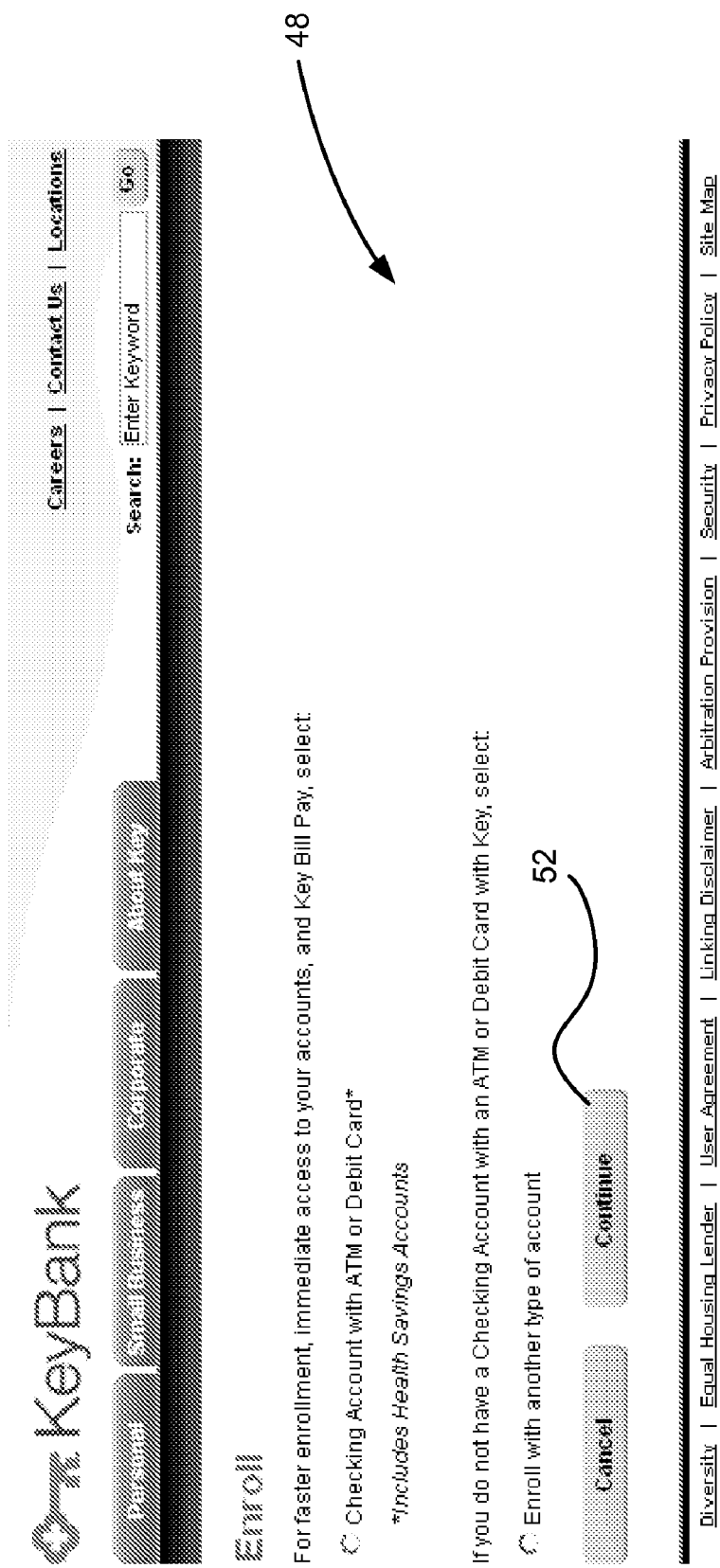
FIG. 14 is a screen asking a user to select a method of enrolling in the process of FIG. 3.

If the user clicks the "Accept" button 44 on page 40, that may signal the server 12 (FIG. 1) to generate an enrollment choices page, as indicated at block 46 in FIG. 3A. As shown in FIG. 14, the enrollment choices page 48 may ask the user to choose between two methods of enrollment. In one method, for example, the user may elect to enter information from a checking account with an associated ATM or debit card. In another method, for example, the user may enroll with a different type of bank account-one that may not have an ATM or debit card associated with it. The display of page 48 on the display 26 of computer 18 is shown at block 50 in FIG. 3A. The user may select which type of enrollment method to pursue and then click the "Continue" button 52. This selection may be received by the server 12 (FIG. 1), indicated at block 52 in FIG. 3A.

Figure 15:
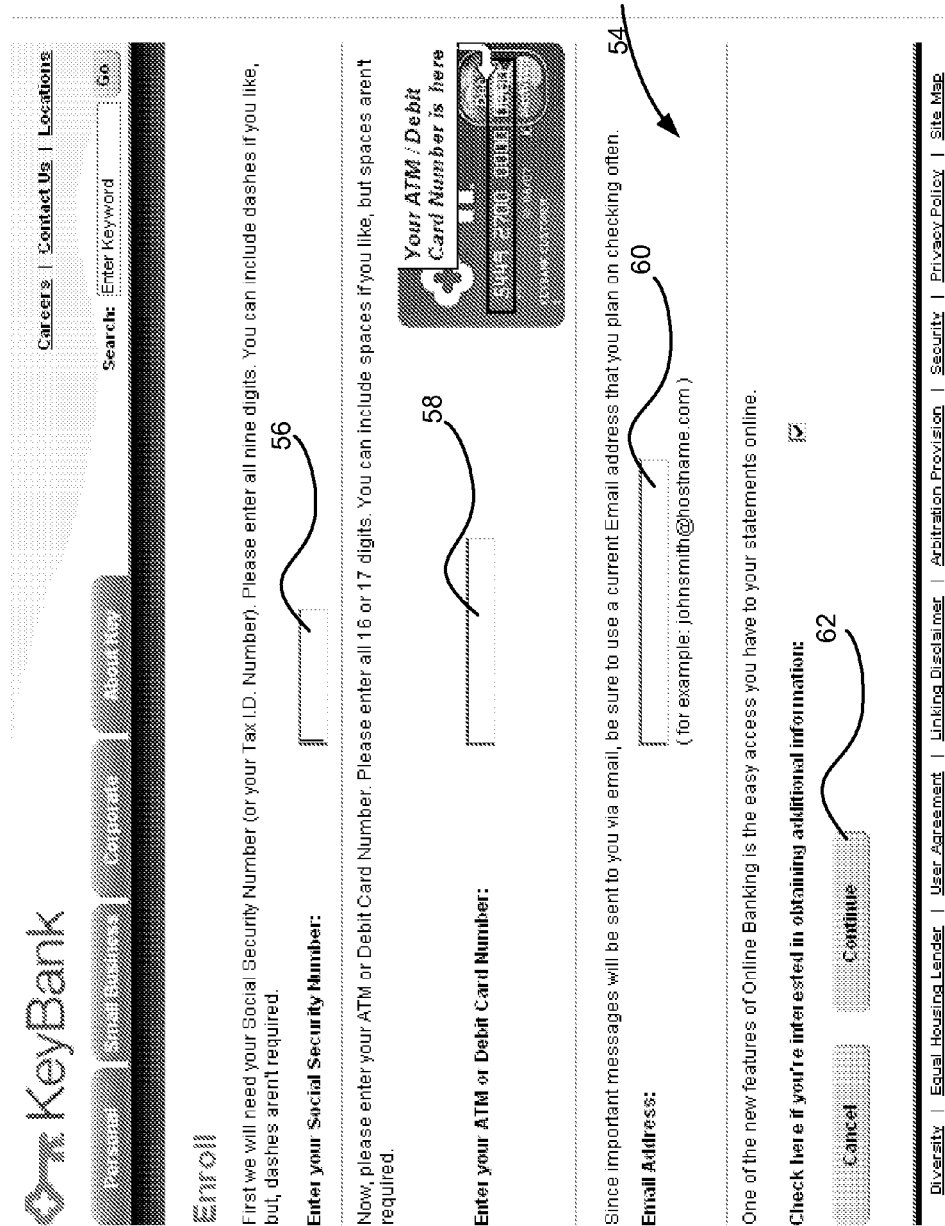
FIG. 15 is a screen asking a user to provide identifier information in the authentication process of FIG. 3.

The server 12 may then send page 54, shown in FIG. 15, to the user's computer 18 (FIG. 1). Page 54 contains a box 56, where the user may enter his or her Social Security number, box 58, where the user may enter his or her ATM or debit card number and box 60, where the user may enter his or her e-mail address. The user may then click the "Continue" button 62. This step is shown at block 64 in FIG. 3A. The information may be sent to the server 12, indicated at block 66. If all of the boxes have been filled in on page 54, then, as indicated at decision diamond 68, the user may be requested to enter his or her PIN and card issue number from his or her ATM card, indicated at block 70. If one or more of the Social Security, ATM card number or e-mail address fail validation, then as shown in decision diamond 68, the user may be directed to re-enter the information, as shown in block 64.

The ATM card number, PIN and card issue number may be received by the server 12 (FIG. 1), indicated at block 72, and validated. At this point, the validation may include determining whether the PIN and card issue numbers contain the appropriate number of and type of alpha-numeric digits. As shown in decision diamond 74 (FIG. 3B), upon validation of the Social Security number, ATM card number, e-mail address, PIN and card issue number, the ATM card number, PIN and card issue number may be authenticated, which may include matching them with corresponding numbers in a bank customer database (not shown) accessed by the server 12, as indicated in block 76.

As indicated in decision diamond 78, upon successful authentication of the ATM card number, PIN and card issue number, the user may be enrolled into the online banking system 10, as indicated in block 80. If authentication is unsuccessful, the user may be directed to an overview page, shown at block 81. As indicated in decision diamond 82, if the user is a new user, a new user ID and password may be created. The user is shown a page (not shown) asking the user to provide a user ID and password, indicated at block 84. The user ID and password may be validated, indicated at block 86, to determine if the appropriate number of alpha-numeric digits are present. As shown in decision diamond 88, upon validation of the user ID and password, the server 12 may store the user ID and password in database 16 (FIG. 1), indicated at block 90. The user then may be asked to log into the system, indicated at block 92.

Referring back to decision diamond 82, if the user is not a new user, but rather is a returning user, the user may be asked to create a new password, but not a user ID, indicated at block 94. The password, Social Security number, ATM card number and e-mail address are then validated, indicated at block 96. As indicated at decision diamond 98, if the validation is successful, the returning user may be invited to log in, indicated at block 92.

Log In Process

Figure 4:
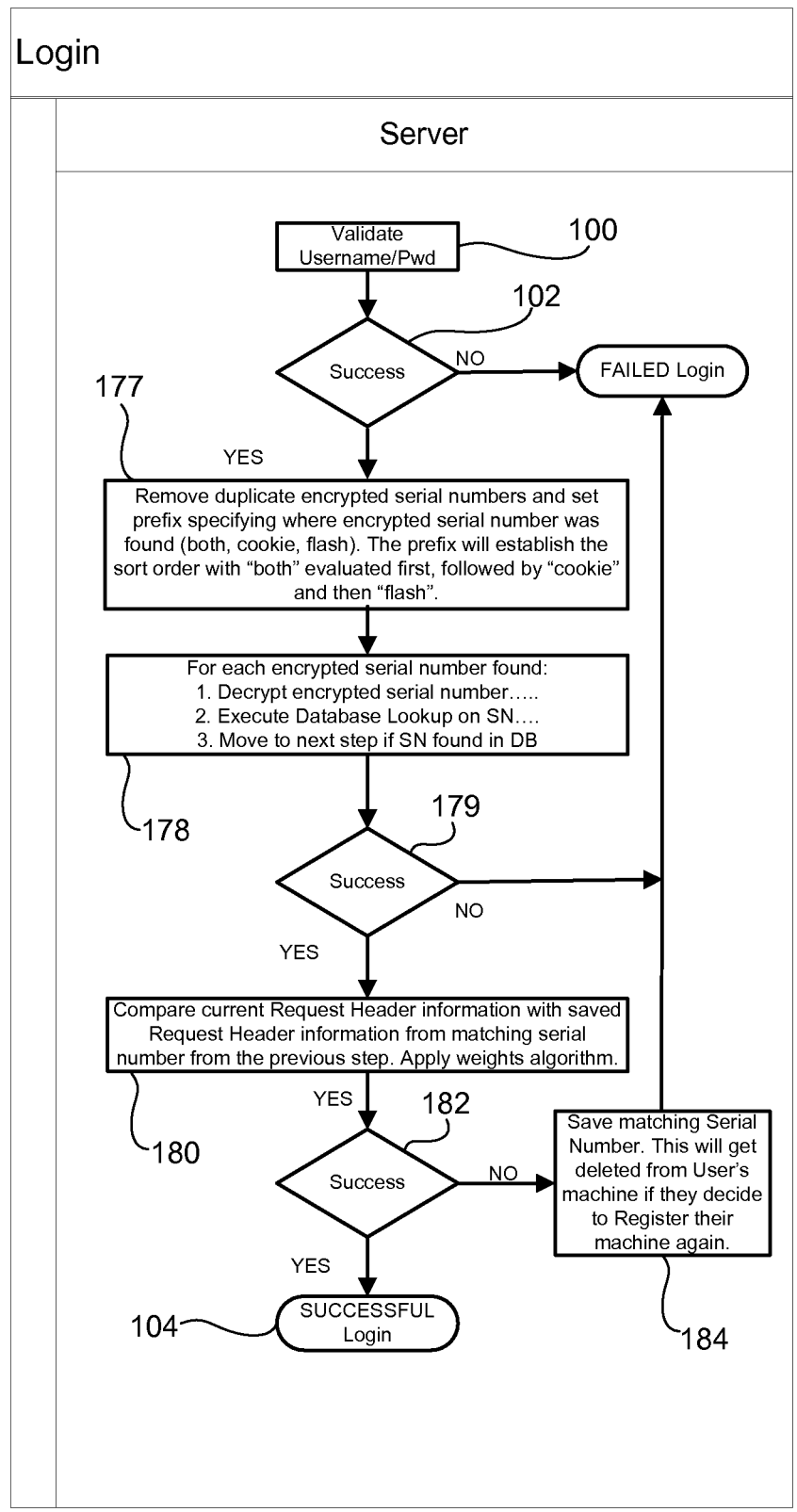
FIG. 4 is a flow chart showing the log in process of the enrollment flow chart shown in FIG. 3.

The log in process is shown at FIG. 4. The user may be requested to enter a user name and password, as indicated in block 100. As indicated by decision diamond 102, upon successful validation of the user name and password, the user may then be logged in, in the case where the user is a first-time user. In that situation, the user may be shown a success message, indicated at balloon 104. The server 12 (FIG. 1) may determine that the user is a first-time user since there are no session cookies or local shared objects to be retrieved from the user computer 18 that contain information, such as encrypted serial numbers, identifying that particular user.

As shown in FIG. 3C, at decision diamond 106, if no such cookies are found, the user may be queried whether he or she wishes to register his or her device. As shown in FIG. 10, the server 12 may display page 108 at the user display 26. The user may indicate a desire to register his or her computer, as by clicking the "Yes" dot 110 and giving his or her computer 18 an alpha-numeric name in box 112. The user then clicks the "Submit" button 114 and sends the information to the server 12 (FIG. 1). The display of this page 108 is indicated in the flow chart of FIG. 3C at block 116. When the page 108 is transmitted to the server 12, the server may also receive the request header information from the browser of the computer 18 (FIG. 1). A registration process is indicated at block 118 in FIG. 3C.

Registration Process

Figure 5:
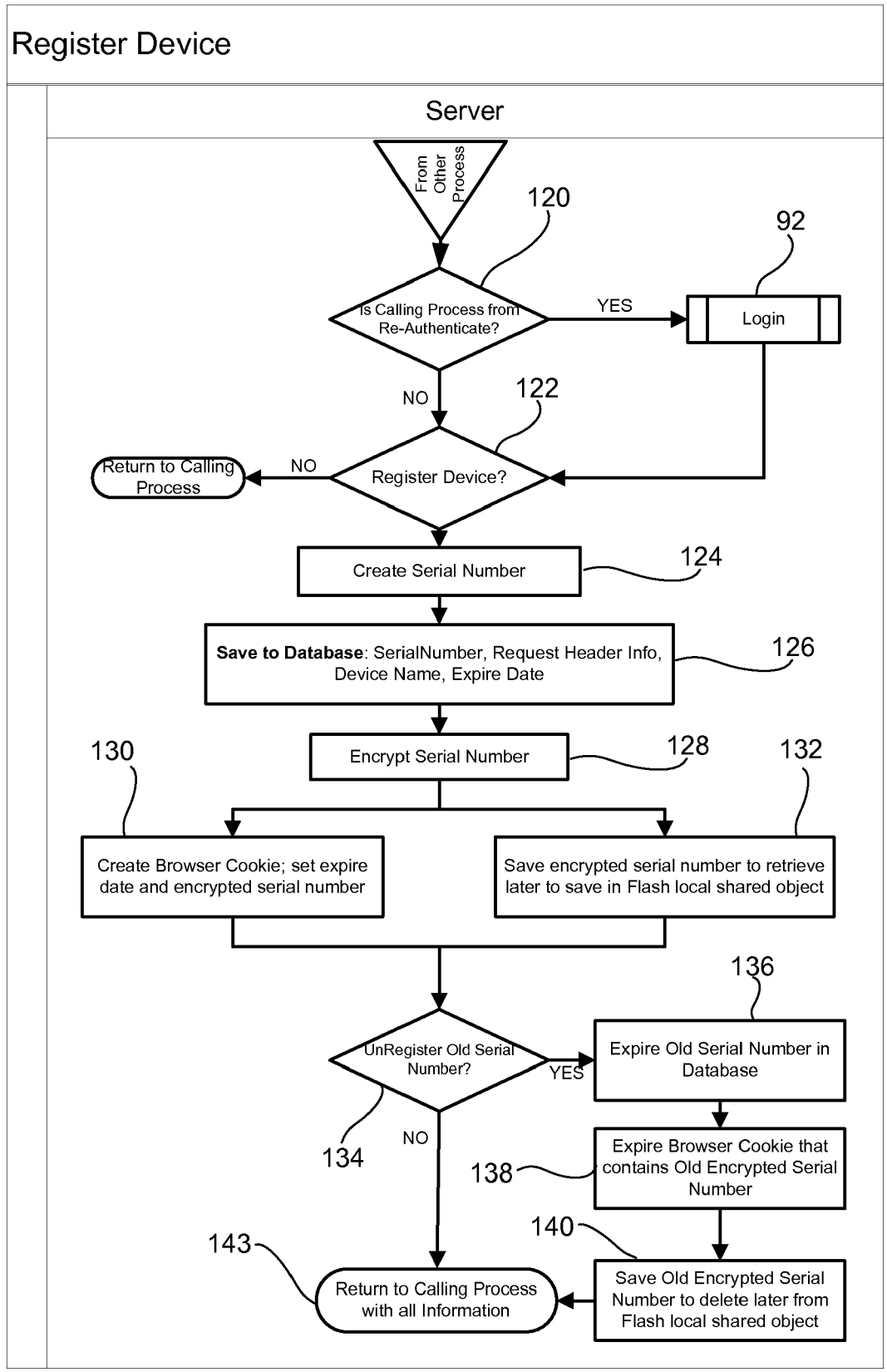
FIG. 5 is a flow chart showing the register process of the enrollment process of FIG. 3.

As shown in FIG. 5, one embodiment of a registration process begins at decision diamond 120. If the registration request is not part of a re-authentication process (see FIG. 7 and accompanying description), the device (e.g., one of computers 18, 20, 22) may be registered, as indicated at decision diamond 122. First, the server 12 may create a serial number unique to the user, indicated at block 124, may save the serial number to a database, along with the request header information received from the user computer 18 with the transmission of page 108, in addition to the device name entered at box 112, and the server further may create an expire date. All of this information may be saved to database 16, as indicated at block 126. The serial number may then be encrypted, indicated at block 128 and, as indicated in block 130, the encrypted serial number may be persisted in a browser cookie that is created by the server 12 to reside in storage 28 of computer 18. The browser cookie may have an expire date associated with it, set by the server software module of server 12. In one embodiment, the serial number has appended to it a date and time stamp and the entire string is encrypted. In one embodiment, the combination of the serial number and date and time stamp is first hashed (e.g., a sha-1 hash) and then encrypted in the browser cookie. Server 12 may also create a local shared object, preferably by utilizing a flash player such as an Adobe flash player plug-in associated with the browser software of the user computer 18. This local shared object creation is indicated at block 132 in FIG. 5. The local shared object may contain the hashed and encrypted serial number, date and time stamp string, as in the browser cookie. A flash local shared object is not deleted as readily as browser cookies. Further, the flash player software creates only a single object for each Internet address.

Figure 16:
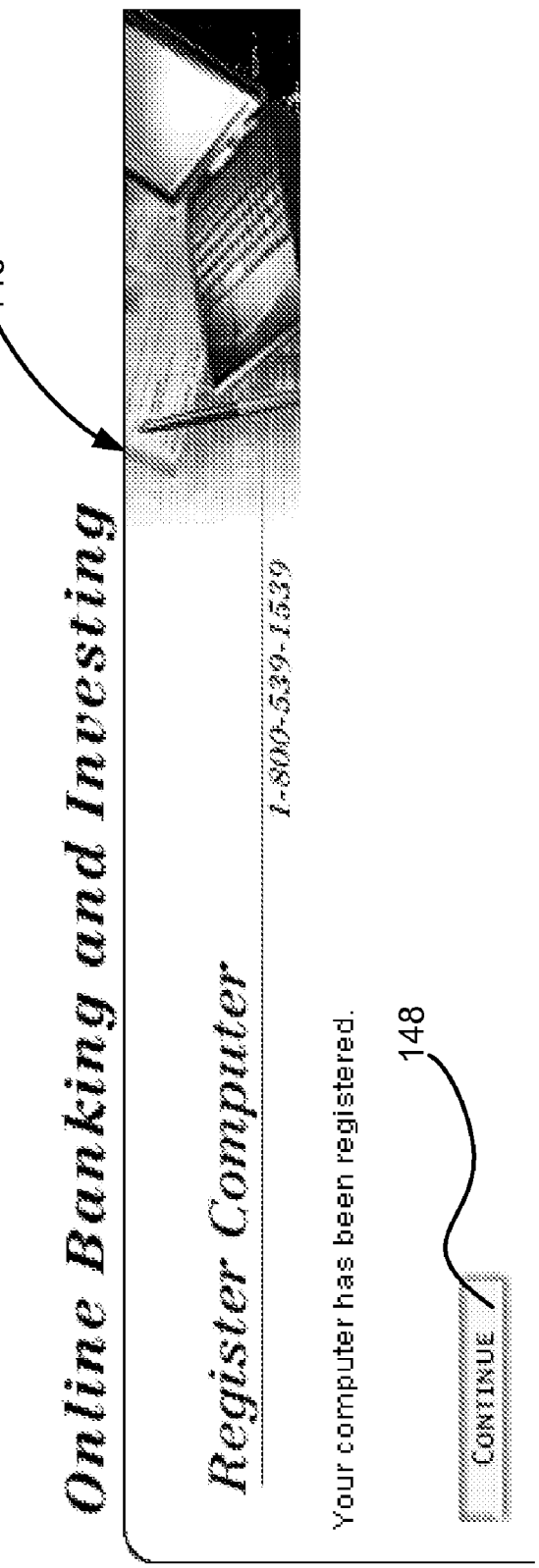
FIG. 16 is a screen notifying a user that he or she has registered his or her computer in the process shown in FIG. 5.

As shown at decision diamond 134, in the event that there is a pre-existing serial number that has expired, it may be unregistered by expiring the old number in the database 16 (indicated at block 136), the browser cookie is also expired, as indicated in block 138, and the old, encrypted serial number is saved to delete later from the flash local shared object, as indicated at block 140. However, if there is no old serial number, then, from decision diamond 134 the process returns to FIG. 3C and decision diamond 142, as indicated by balloon 143. At that decision diamond 142, if the device is successfully registered, a success page may be displayed at display 26 (FIG. 1), as indicated at block 144, and shown in FIG. 16 as page 146. At this point, the user may press the "Continue" button 148 at computer 18 and the user may then be allowed to enter the online banking system, indicated at balloon 149.

As shown in FIG. 2, the registration process, which may begin at decision diamond 122 in FIG. 5, may include the creation of a record 150. The record 150 may include a field 152 for the user ID number, a field 154 for the serial number created in block 124 of FIG. 5 and a field 156 for HTTP request headers. With the record 150, a user may register multiple devices 158, 160, 162, corresponding to computers 18, 20, 22, respectively. For each device 158, 160, 162, the record 150 may include the assigned serial numbers 164 and the values for the various request headers 166. In this way, the server 12 (FIG. 1) may perform the disclosed authentication process for a user at any number of computers, provided that each of the computers used is registered as shown in FIG. 5.

Sign On Process

Figure 6:
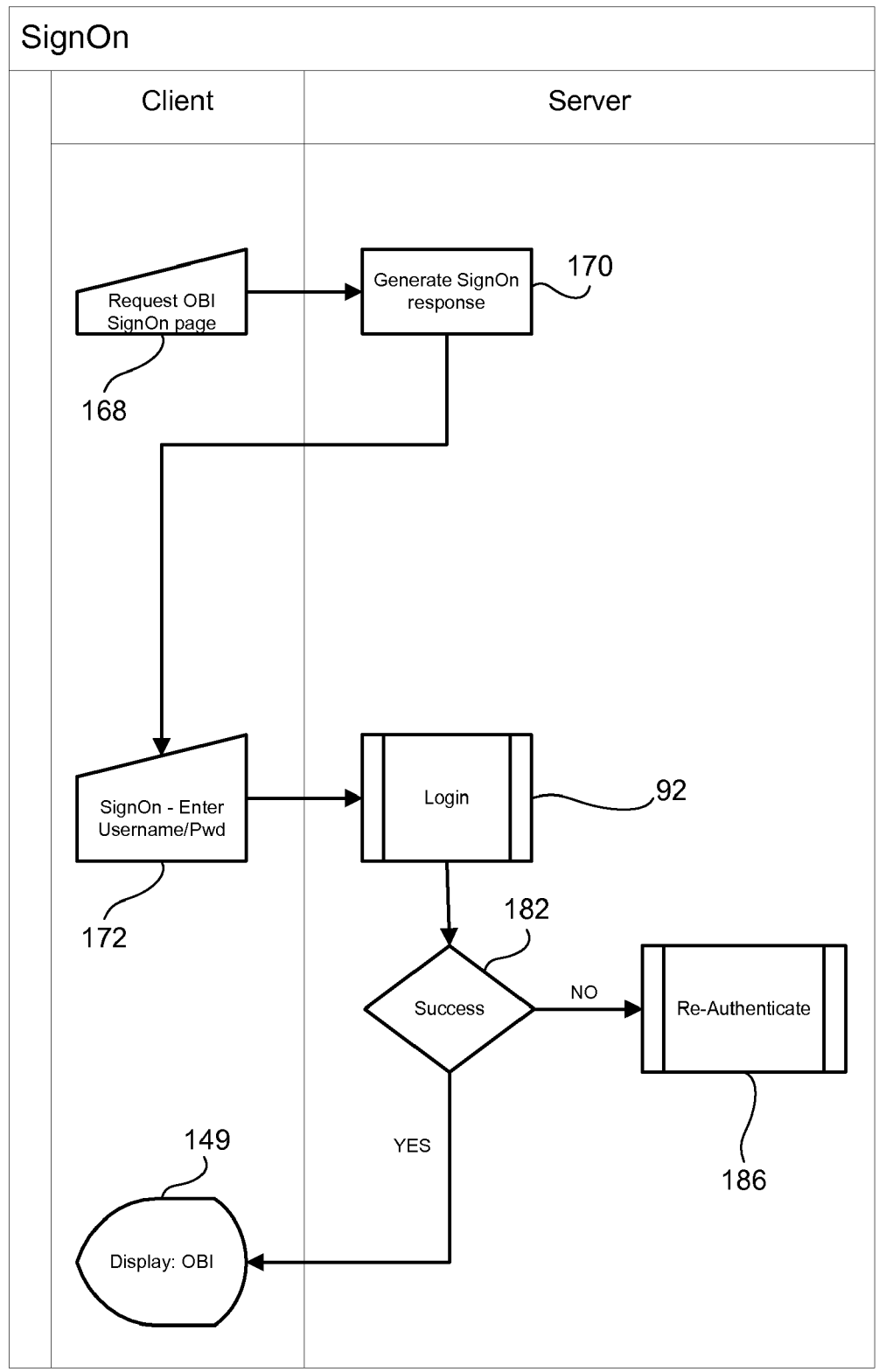
FIG. 6 is a flow chart showing the sign on process of the system shown in FIG. 1.
Figure 8:
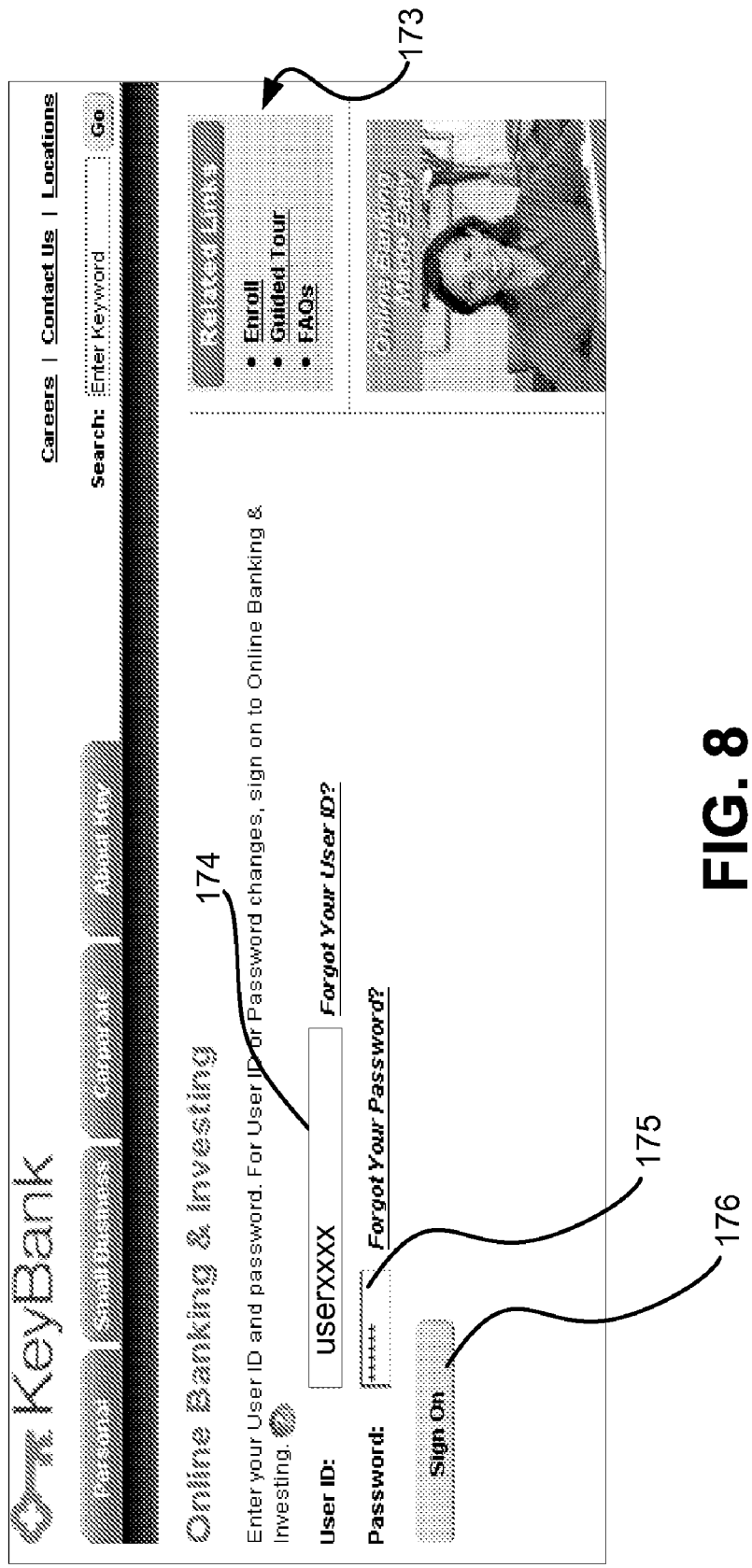
FIG. 8 is a sign on screen of the system shown in FIG. 1.

After a user has enrolled, as explained with reference to FIGS. 3A, 3B and 3C, and registered his or her computer, as explained with reference to FIG. 5, thereafter, the user may sign on to the system 10 as shown in FIG. 6. The sign on process may begin, as indicated in block 168, with the user sending a request to the server 12 from the user computer 18 (FIG. 1) for a sign on page. As shown in block 170, the server 12 may generate a sign on page which is shown on the display 26 of the computer 18, as indicated at block 172. The sign on page may include boxes for the user to enter his or her identification number and password. An example of a sign on page 173 is shown in FIG. 8. The user enters his or her user identification number in box 174 and password in box 175. The user then clicks the "Sign On" button 176 when the user clicks "Sign On" button 176, the sign on page may run a Java script and flash action script that collect data from the flash local shared object stored in storage 28 at user computer 18 (FIG. 1).

When the user clicks to send the sign on information to the server 12, the request may also contain the encrypted serial numbers stored within the browser cookie stored at the user computer 18 and the encrypted serial numbers from the flash local shared object. Further, the request may contain request header information. The sign-on process then proceeds to the log in process, indicated at block 92 and shown in FIG. 4. As described earlier, and indicated in block 100, the user name and password may be validated and if successful, any duplicate encrypted serial numbers may be removed from the cookies and a prefix may be set that specifies where the encrypted serial numbers were found (i.e., in both the cookie and the flash local shared object, the cookie alone or the flash local shared object alone). The prefix may establish the sort order for the particular computer 18, with "both" evaluated first (that is, both the browser cookie and flash local shared object) followed by "cookie" (that is, looking for the cookie only) and then "flash" (looking for the flash local shared object only). This process is shown in block 177.

As shown in block 178, server 12 may then decrypt each encrypted serial number found and execute a database lookup based upon the serial number. As indicated in decision diamond 179, upon successful identification of the serial number, the server may then proceed to the step in block 180, which is to compare the current request header information with the request header information stored in record 150 (see FIG. 2) and associated with the serial number 154 and user ID number 152 for that computer 18. As indicated at decision diamond 182, if the match exists, the log in is successful, as indicated at balloon 104 in FIG. 4, and, as indicated in FIG. 6, the user may be allowed to enter the banking system, indicated at block 149 in FIG. 6.

In one embodiment, the request headers are each given a weighted value and the server 12 finds a match only if the total of the weighted values of the matching request headers equals or exceeds a predetermined number. Table I below shows the request header attributes and weighted value for each.

TABLE I

| Attribute | Weighted Value |
| --- | --- |
| Locale | 10 |
| User-agent | 6 |
| Accept-encoding | 5 |
| IP Address | 4 |
| Character Encoding | 3 |
| Referrer | 2 |
| Accept | 1 |
| Remote Host | 0 |

In one embodiment, if a request header from a user computer is 80 percent correct, the match is sufficient to allow that user to enter the banking system, as indicated at block 149 in FIG. 6.

As shown in FIG. 4, if the request header information from the computer does not match, or does not sufficiently match the stored request header information (see FIG. 2), as indicated at block 184, the matching serial number may be saved and may be deleted from the user's machine if the user decides to register that computer 18 again.

Re-Authentication Process

Figure 7A:
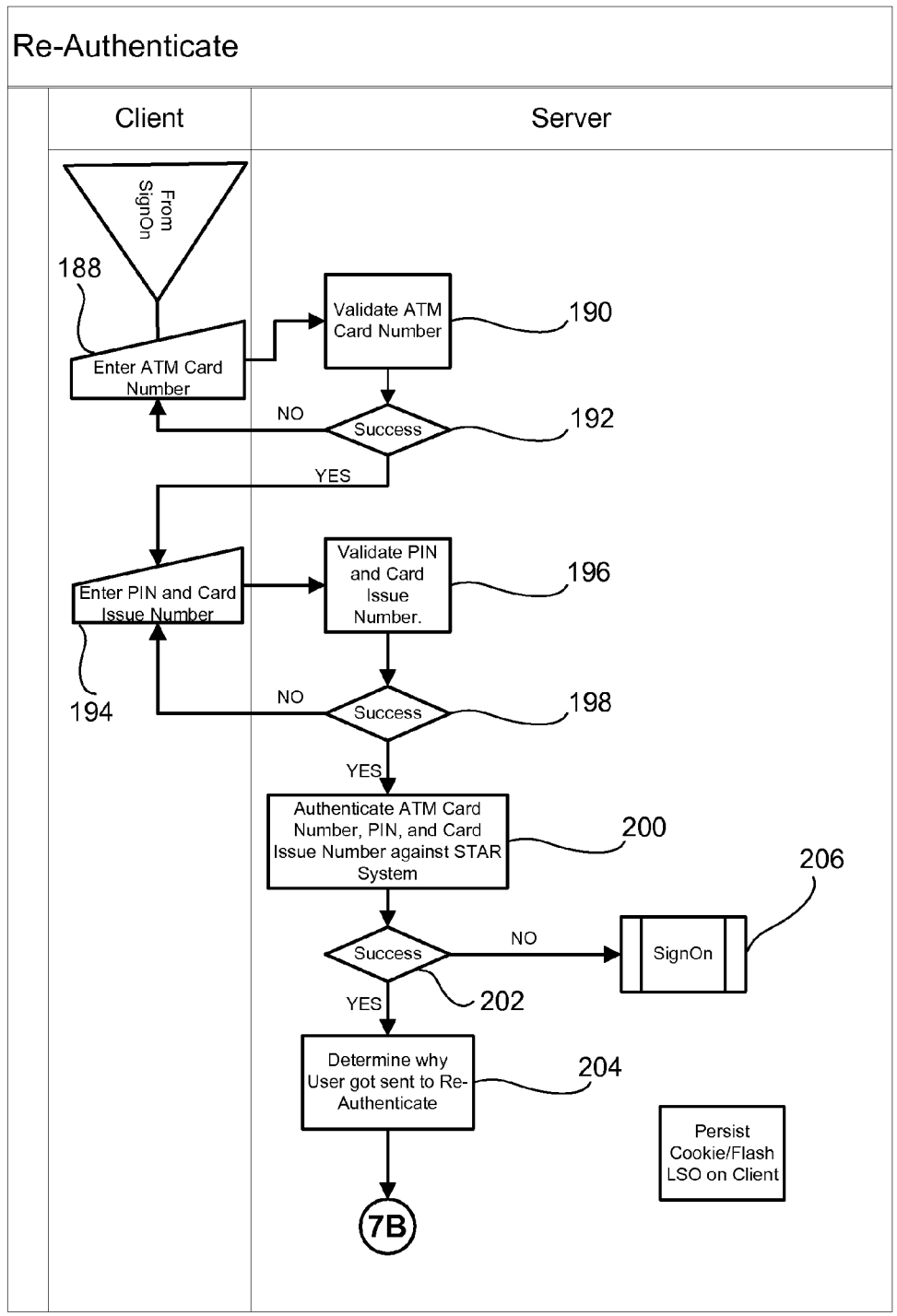
FIGS. 7A and 7B are a flow chart showing the process to re-authenticate a user of the system shown in FIG. 1.

As shown in FIG. 6, if the log in process is not successful, as shown at decision diamond 182, the user may be directed to re-authenticate his or her computer, indicated at block 186 and described with reference to FIGS. 7A and 7B. The re-authentication process may begin with the server 12 (FIG. 1) directing the user to enter his or her ATM card number, indicated at block 188. The ATM card number may be transmitted to the server 12 and validated, as indicated at block 190 (that is, the card number may be checked to ensure that it has the appropriate number of alpha-numeric characters). As indicated at decision diamond 192, if the ATM card number is validated successfully, the user may be directed to enter his or her PIN and card issue number, indicated at block 194. The PIN and card issue number are validated, as indicated at block 196, to verify that they each have the correct number of alpha-numeric characters. As indicated in decision diamond 198, if successfully validated, the ATM card number, PIN and card issue number may then be authenticated, as indicated at block 200. In each case with decision diamonds 192 and 198, if the validation is not successful, the user may be again asked to enter the requested number, as indicated in blocks 188, 194, respectively.

Figure 7B:
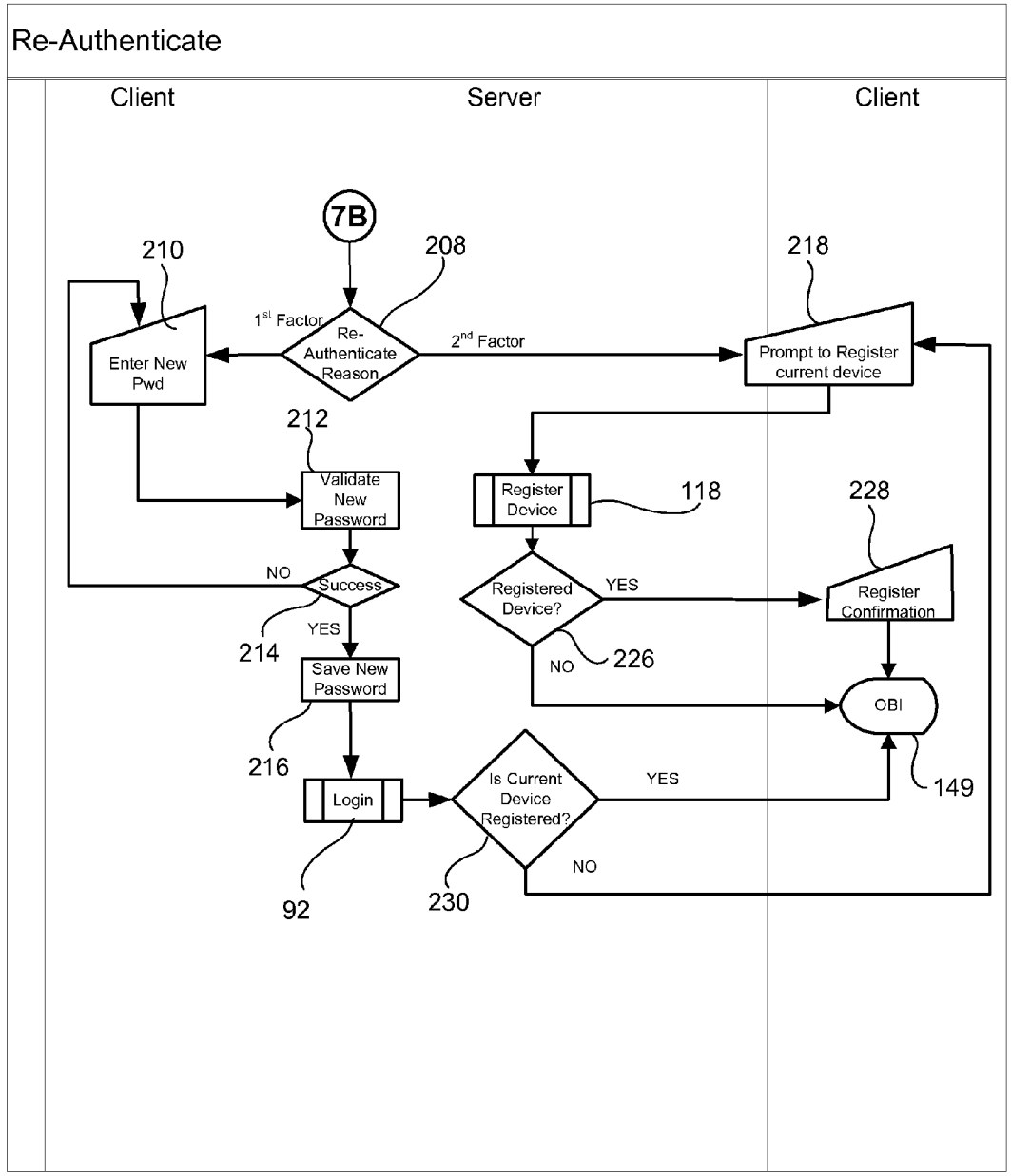

As shown in decision diamond 202, if the authentication is successful, the server 12 determines the reason for re-authentication, as indicated at block 204 (FIG. 7B). If the authentication process is not successful, then as indicated at decision diamond 202, the user is directed to the sign on process, indicated at block 206, and described with reference to FIG. 6. As shown at decision diamond 208, if the reason for re-authenticating is the absence of or entry of an incorrect password, as shown in block 210, the user may be directed to enter a new password. The new password may be validated, as shown at block 212, and, as indicated at decision diamond 214, if successful, the new password may be saved, as indicated at block 216 in the record 150 stored in database 16. The user may then be directed to the log in process, indicated at block 92 and described with reference to FIG. 6.

Figure 11:
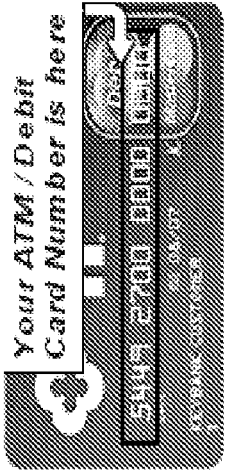
FIG. 11 is a screen asking a user whether he or she wishes to re-authenticate his or her computer into the system of FIG. 1.

Referring back to decision diamond 208 (FIG. 7B), if the reason for re-authentication is the absence of or an incorrect encrypted serial number, then, as indicated in block 218, the user may be prompted to register his or her computer 181 (FIG. 1). If the user consents, then the registration process may begin, as indicated in block 118 and described with reference to FIG. 5. As shown in FIG. 5, if the registration process is sent from the re-authenticate process, then as indicated in decision diamond 120, the user is directed to the log in process 92, shown in FIG. 4. As shown in FIG. 11, the user is shown page 219 at display 26. The user is requested to enter his or her ATM or Debit Card number in box 220. The user clicks the "Continue" button 221 and is directed to page 222, shown in FIG. 9. The user is directed to enter his or her ATM or debit card PIN in box 223 and debit card issue number in box 224. The user clicks the "Continue" button 225. This entry of data and its subsequent validation is represented by block 100 in FIG. 4.

After the registration process indicated at block 118 is completed, as shown in decision diamond 226 (FIG. 7B), if the user elects to register his or her computer 18, then, as shown in block 228, the user may be given a confirmation that his or her computer has been registered and, as indicated in block 149, the user may be given access to the computer banking system 10.

Referring to decision diamond 226, if the user elects not to register his or her computer 18, the user nevertheless may be allowed access to the computer banking system, as indicated at block 149, but must later provide additional identifying information with each subsequent sign on.

With respect to log in block 92 in FIG. 7B, if, after the log in process has been completed, the user's computer 18 is registered, as indicated at decision diamond 230, the user may be given access to the computer banking system, indicated at block 149. If the computer 18 is not registered, the user may be prompted to register his or her current computer, as indicated in block 218, and at that point may elect whether or not to register his or her computer.

The foregoing disclosure describes a system and method for authentication of users in a secure computer system that provides multiple levels and methods of authentication. Moreover, the system and method does not require additional components or peripherals to be employed at user computers. However, it is within the scope of the disclosure to utilize the described method and system in conjunction with an authentication process that uses biometrics (i.e., voice recognition, fingerprint scan, retinal scan), a token or other authentication method, including methods that require additional components or peripheral devices.

Another advantage of the system and method is that it accommodates multiple users at multiple remote computers. More specifically, the disclosed system and method may allow multiple users to be authenticated in the secure computer system 10 (FIG. 1) using the same computer 18, 20, 22. Each user may enroll in the system 10 using the process of FIGS. 3A-3C. As part of the device registration process, described with reference to FIG. 5, the server 12 may create and encrypt a serial number for that user and persist the encrypted serial number in a browser cookie and local shared object as indicated in blocks 130 and 132 in FIG. 5, resulting in a computer with a browser cookie and local shared object having several encrypted serial numbers, each corresponding to a single, different user. Each such user may have a separate record 150 (FIG. 2) stored in database 16 that contains that user's device names 158, 160, 162, serial numbers 154, and request header attributes 156.

While the systems, components and methods disclosed herein constitute embodiments of the subject method and system, the invention should not be limited to these disclosed embodiments. It is to be understood that changes may be made therein without departing from the scope of the invention.

What is claimed is:

1. A method of authenticating a user in a secure computer system comprising the steps of:

in an enrollment session between the computer system and a client computer of a user, creating and storing a first user identifier at the computer system, and associating the first user identifier with the user, creating and storing a second user identifier, unique to the user and selected by the computer system and that is not related to the client computer, at the computer system, and associating the second user identifier with the user, creating a persistent object containing the second user identifier, encrypting the persistent object and storing the encrypted object at the client computer, and storing request header attributes from the client computer received during the enrollment session at the computer system but not at the client computer, and associating the request header attributes received during the enrollment process with the first and second user identifiers; and in a subsequent sign on session between the computer system and the client computer, transmitting from the client computer to the computer system a request for a sign-on page;

transmitting from the computer system to the client computer a prompt for the first user identifier;

in response to said prompt, transmitting from the client computer to the computer system a request including the first user identifier, the second user identifier stored in the object stored at the client computer and a plurality of current request header attributes;

authenticating at the computer system the first user identifier;

authenticating at the computer system the second user identifier;

comparing the transmitted plurality of current request header attributes with a the plurality of request header attributes received during the enrollment session, stored at the computer system and associated with the first user identifier; and if the first and second user identifiers are authenticated, and if the transmitted request header attributes correspond to the stored request header attributes, transmitting a success message to the client computer to be viewed by the user and allowing the user into the secure computer system, wherein the secure computer system does not modify the persistent object created in the enrollment session or create a new persistent object.

2. The method of claim 1 wherein the step of comparing the transmitted plurality of request header attributes with a plurality of stored request header attributes includes the step of determining whether a match exists therebetween of a predetermined number of said transmitted and said stored header attributes fewer than all of said transmitted and stored request header attributes.

3. The method of claim 1 wherein the step of comparing the transmitted plurality of request header attributes with a plurality of stored request header attributes includes the steps of
assigning a weighted value to each of said request header attributes and
determining whether a match exists between said transmitted header attributes and said stored request header attributes such that a sum of weighted values of matching transmitted and stored request header attributes equals or exceeds a predetermined value.

4. The method of claim 3 wherein the determining step includes the further step of sending an error message to the client computer to be viewed by the user instead of the success message in the event that the sum of weighted values of matching transmitted and stored request header attributes is less than the predetermined value.

5. The method of claim 4 wherein the step of sending an error message further includes the step of sending a message to the client computer to be viewed by the user that the user must enroll in the computer system.

6. The method of claim 1 wherein the comparing step includes the step of comparing a transmitted locale request header attribute to a stored locale request header attribute.

7. The method of claim 1 wherein the comparing step includes the step of comparing a transmitted user-agent request header attribute to a stored user-agent request header attribute.

8. The method of claim 1 wherein the comparing step includes the step of comparing a transmitted accept-encoding request header attribute to a stored accept-encoding request header attribute.

9. The method of claim 1 wherein the comparing step includes the step of comparing a transmitted IP address request header attribute to a stored IP address request header attribute.

10. The method of claim 1 wherein the comparing step includes the step of comparing a transmitted character-encoding request header attribute to a stored character-encoding request header attribute.

11. The method of claim 1 wherein the comparing step includes the step of comparing a transmitted referrer request header attribute to a stored referrer request header attribute.

12. The method of claim 1 wherein the comparing step includes the step of comparing a transmitted remote host request header attribute to a stored remote host request header attribute.

13. The method of claim 1 wherein the step of transmitting a second user identifier includes the step of transmitting a plurality of second user identifiers stored in said object, each of said second user identifiers being associated with a different user.

14. The method of claim 13 wherein the step of validating at the computer system the second user identifier includes the step of sorting said plurality of second user identifiers to find a match between one of said plurality of second identifiers and said first identifier.

15. The method of claim 1 wherein the step of transmitting a second user identifier includes the step of transmitting a second user identifier stored in a local shared object stored on said client computer.

16. The method of claim 15 wherein the step of transmitting a second user identifier includes the step of transmitting a second user identifier including an encrypted serial number associated with said user.

17. The method of claim 16 wherein the step of transmitting a second user identifier including an encrypted serial number associated with said user includes the step of transmitting a second user identifier including an encrypted serial number and date-time stamp.

18. The method of claim 17 wherein said serial number and date-time stamp are hashed, then encrypted.

19. The method of claim 1 wherein the user identifier includes at least one of a Social Security number, ATM number, ATM PIN and email address of the user.

20. The method of claim 1 wherein the second user identifier includes a serial number and the step of creating a persistent object on the client computer includes the step of appending a date and time stamp to the serial number and encrypting the serial number, date and time stamp.

21. A method of authenticating a banking customer to allow the banking customer access to a secure banking computer system comprising the steps of:
in an enrollment session between the computer system and a client computer of the banking customer,
creating and storing a first user identifier at the banking computer system, including a banking customer identification and password, and associating the first user identifier with the banking customer at the banking computer system,
creating and storing a second user identifier, unique to the banking customer and selected by the banking computer system and that is not related to the client computer, at the banking computer system, and associating the second user identifier with the banking customer at the banking computer system,
creating a persistent object containing the second user identifier, encrypting the persistent object and storing the encrypted object at the banking client computer, and
storing request header attributes from the client computer received during the enrollment session at the banking computer system but not at the client computer, and associating the request header attributes received during the enrollment process with the first and second user identifiers; and
in a subsequent sign on session between the banking computer system and the client computer,
transmitting from a client computer of the banking customer to the banking computer system a request for a sign-on page;
transmitting from the banking computer system to the client computer a prompt for a customer identification number and password;
in response to said prompt, transmitting from the client computer to the banking computer system a request including
the banking customer identification and password,
the second user identifier stored at the client computer and
a plurality of current request header attributes;
authenticating at the banking computer system the banking customer identification and password;

authenticating at the banking computer system the second user identifier;

comparing the transmitted plurality of current request header attributes with the plurality of request header attributes stored at the banking computer system and associated with the banking customer identification, password and second user identifier; and if the banking customer identification, password and second user identifier are authenticated, and if the transmitted request header attributes correspond to the stored request header attributes, transmitting a success message to the client computer to be viewed by the banking customer and allowing the client computer into the secure banking computer system, wherein the secure banking computer system does not modify the persistent object created in the enrollment session or create a new persistent object.

* * * * *